June 13, 1972 J. E. PETERS ET AL 3,669,634
METAL COMPOSITES
Filed June 18, 1968
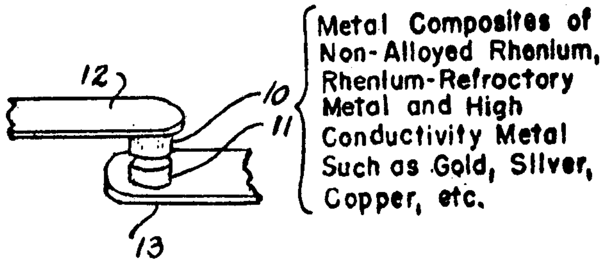

United States Patent Office 3,669,634

Patented June 13, 1972

3,669,634
METAL COMPOSITES

John E. Peters, Chagrin Falls, Ohio, and Fred J. Rollfinke, Bronxville, N.Y., assignors to Chase Brass and Copper Company Incorporated, Cleveland, Ohio Filed June 18, 1968, Ser. No. 737,984
Int. Cl. B22f 3/16
U.S. Cl. 29—182.1 7 Claims

ABSTRACT OF THE DISCLOSURE

Powder metal composites and mill products formed thereof are disclosed in which two metal components are admixed in powder form and compacted under conditions which maintain the component metals in substantially unalloyed condition. Rhenium and rhenium-refractory metal mixtures comprise a first component, while metals such as gold, silver and copper having high electrical and thermal conductivity comprise the other component.

This invention pertains to metal composites, and particularly to integral composites of a first metal component comprising rhenium or rhenium-refractory metal mixtures in combination with another metal component comprising a metal or metal alloy having high thermal and electrical conductivity. The several metal components are integrated to form metallic composites useful for fabrication of various articles and are characterized by the fact that the metal components are in substantially unalloyed condition. The invention also relates to the method of making such metal composites and the fabrication of mill products therefrom.

A principal aim of the invention is to produce a metallic material useful for fabrication of electrical contacts, electronic components and certain high temperature ionic equipment applications.

Electrical contact alloys have long been the subject of intensive investigation in order to improve the electrical and thermal conductivity of such contacts and the useful life thereof. Metals having superior electrical conducting properties, such as silver, gold or copper, generally lack wear resistance. In the case of the precious metals they also have the disadvantage of high cost. The lower cost materials such as copper on the other hand are much more subject to corrosion and erosion. Refractory metals such as tungsten, molybdenum and tantalum possess excellent hardness and high temperature resistance, but they are not good conductors and do not have a high heat dissipation capacity. Many of the foregoing metals also are subject to the disadvantage of polymer or film formation on their surfaces, particularly under arcing conditions, which will impair conductivity across a pair of contact points. Refractory metals such as rhenium offer substantial improvement in this latter respect, as well as reasonably good conductivity, but again are high in cost. Alloying of seveal metals has been utilized to obtain a resulting product possessing some of the advantages of each of the alloying components. Such alloys however represent a compromise, as the nature of the individual metal components are necessarily changed to a greater or lesser extent in the course of the alloying process.

The present invention makes possible metal materials which preserve to a much greater extent the individual characteristics and advantages of the several individual components in the resultant metal material.

In brief, this is achieved by forming an integral composite of rhenium or rhenium-refractory metal mixture as a first component, and a precious or nonprecious metal or metal alloy of high thermal and electrical properties as a second metal component. The rhenium-bearing component may be pure rhenium or a mixture of rhenium and another refractory metal such as tungsten, molybdenum or tantalum. This rhenium-bearing component can be introduced as a finely divided powder which, in the composite, comprises a sintered skeletal structure, and this rhenium-bearing material is then infiltrated or intermixed with a matrix of the second metal component. Gold and silver are examples of metals of the latter group which are useful; copper and similar metals having good conductivity may also sometimes be used to advantage because of lower costs if the corrosion resistance requirements are not so stringent. An alternative procedure is to mix appropriate proportions of the desired constituents in powder form, compacting and sintering to form the desired composite material. According to this latter procedure, the gold, silver or copper constituent is mechanically intermixed with the rhenium-bearing material by a mixture of powders of the several metals before any compaction of them.

The resultant metal material has distinct advantages over metallurgical or true alloys of the same components in respect to maintaining the desirable physical and electrical properties of the individual constituents. The metal composites thus exhibit an improved behavior with respect to electrical and thermal conductivity, arc erosion resistance, mechanical wear, resistance to contaminated atmosphere poisoning, and the like. The invention is illustrated by the following examples.

EXAMPLE I

A disc was prepared from pure rhenium powder by pressing the powder in a cylindrical die at a pressure of 25 tons/in.$^2$. The average particle size of the rhenium powder was 2.10 microns. The disc, weighing 7.2 grams, had a pressed size of 1.030" diameter x 0.061" thick. The pore volume in this preliminary compact was determined as approximately 59%.

This disc was sintered in a hydrogen atmosphere for one hour at 1400° C. The sintering reduced the pore volume to approximately 45%.

The sintered disc was then infiltrated with gold using high purity (99.999%) gold "splatters." Infiltration was carried out by placing the rhenium disc in a carbon jig, with an opening slightly larger in diameter and thickness than the disc. Sufficient gold splatters to fill the pores of the rhenium and to provide a slight excess was placed on and around the disc. The disc and gold were placed in a hydrogen atmosphere furnace for 30 minutes at a temperature of 1400° C. whereupon the gold filled the pores in the rhenium skeleton.

The disc was then removed from the furnace, excess gold was sanded off the surface, and the disc was reduced in thickness by cold rolling in a conventional rolling mill. It was necessary to anneal the disc after each 20% reduction in thickness. Annealing was done at 1650° C. for 10 minutes in each case. This procedure was continued until a thickness of 0.007" was reached. Some gold was lost upon annealing which reduced the gold content to 31% by weight on the 0.007" sheet. However, the finished sheet showed a structure with no visible porosity.

Small discs, 0.095" diameter x 0.007" thick were made from the sheet by cold punching and were subsequently assembled by brazing onto a voltage regulator contact arm for testing as an electrical contact material.

Hardness of the impregnated disc was 359 V.H.N.

EXAMPLE II

A mixture was prepared using a blend of 50% rhenium and 50% gold powders, by volume, which equals 52% rhenium and 48% gold by weight. The average particle size of the rhenium was 2.10 microns, while that of the gold was 6.9 microns. The gold has a purity of 99.999%.

The powder mixture was blended by using a combination of dry and wet blending techniques in order to achieve a heterogeneous mixture.

A disc was pressed from the powder blend using a pressure of 25 tons/in.². The weight of this disc was 7.1 grams and its pressed dimensions were 1.030" diameter x .045" thick.

This disc was sintered in a hydrogen atmosphere at 1400° C. for one hour, whereupon the gold in the mixture became liquid and aided in densifying the disc. The density of the resulting disc was 15.2 gm./cc. after sintering, or 76% of the theoretical value of 20.0 gm./cc. for the compact.

The disc was then cold rolled with a total reduction of thickness in 57% followed by a 5 minute anneal at 1400° C. in hydrogen. A subsequent additional 59% reduction in thickness was achieved after annealing to provide a final thickness of 0.007" in the sheet material.

The final composition of the 0.007" sheet was determined to be 51% rhenium and 49% gold by weight.

EXAMPLE III

Two mixtures were prepared by blending rhenium and silver powders in the ratios of 70 volume percent Ag–30 volume percent Re, which equals 53.5% Ag–46.5% Re by weight; and 50 volume percent Ag and 50 volume percent Re, which equals 33% Ag–67% Re by weight. The average particle size of the rhenium was 2 microns, while that of the silver was 4.8 microns.

The powder mixtures were blended similarly to those in Example II.

Discs were pressed from these powders at pressures of 20 tons/in.² to sizes of 1.0330" diameter x .028" thick, with sample weights of 3.5 grams each.

Sintering was done in hydrogen at 1120° C. for one hour. These conditions resulted in densities of 86% of the theoretical for the 70–30 material and 80% of the theoretical for the 50–50 material. Sintered dimensions were .984" dia. x .027" thick on the 70–30 and .925" dia. x .029" thick on the 50–50 composition. All percentages and proportions here spoken of are in terms of volume.

The discs were cold rolled to .015" thickness, annealed at 900° C. for 30 minutes and rolled to a final thickness of .010".

Discs of .125" diameter were punched from the resulting sheet and brazed to copper backings using a Cu-Ag-P brazing alloy for subsequent testing as electrical contacts.

Metallographic examination of the finished sheet showed little visible porosity and a well-dispersed silver phase. Typical dimensions of the silver locations were .010 x .033 mm. Hardness measurements of the .010 sheet were 84–113 V.H.N. (70–30 material) and 119–131 V.H.N. (50–50 material).

EXAMPLE IV

A two-layer electrical contact material was made using, for the first layer, a mixture having a composition of 65% tungsten-35% silver (by weight). The second layer was formed of a composition of 65% of a tungsten-rhenium mixture (95%–5%) and 35% silver, all percentages here being by weight.

This was made by pressing 8.72 grams of tungsten containing an organic binder (for higher pressed strength) at a pressure of 6 tons/in.² in a 1.030" diameter die. One gram of powder (also containing a binder) consisting of a mixture of 95% tungsten–5% rhenium (by weight) was distributed over the surface of the pressed tungsten compact and the compact plus powder layer was pressed at 12 tons/in.². Thicknesses were about .065" for the tungsten layer and .010" for the W-Re layer.

The piece was then presintered for 20 minutes in hydrogen at 1400° C. to remove the binder and to impart additional strength to the compact.

Next, sufficient silver to fill the pores and to provide a slight excess was placed on the compact in a carbon jig and the jig was placed into a furnace at 1400° C. under hydrogen for 1½ hours.

The resulting piece was found to be mostly free of porosity with good bonding between the interfaces of the two layers and had a well-disbursed silver distribution.

The porosity of the piece before silver impregnation was such that the silver content of the finished piece was 35% (by weight).

This material was subsequently machined into rectangular shaped, bi-layer electrical contacts.

EXAMPLE V

A powdered metal composite in the form of approximately 3 feet of .080" diameter wire of 95% Ag–5% Re by weight was prepared in the following manner:

100 grams of a 95% Ag–5% Re by weight blend were prepared from silver powder with an average particle size of 4.8 microns and from rhenium powder having an average particle size of 2 microns, sieved through 325 mesh screen. The powders were thoroughly mixed according to standard powder metallurgy practice.

A rectangular bar, measuring ¼" x ¼" x 12" was pressed from 80 grams of the mixed powders at a pressure of 15 tons/in.².

The bar was sintered for one hour in a hydrogen atmosphere at a temperature of 900° C. to produce higher strength.

The sintered bar was then worked by a combination of swagging and wire drawing to a final diameter of .080". Annealing at approximately 500–900° C. was carried out at various points in the fabrication of the wire when necessary.

The resulting wire showed a good surface finish, a density of greater than 95% of theoretical, and a uniform distribution of rhenium particles in a silver matrix.

Samples of this wire were successfully tested as relay contacts.

Resulting relay contacts produced in accordance with the invention illustrated by the foregoing examples show improvement over relay contacts of the conventional alloy type. One of the principal reasons for this is the following. Contact points containing elemental rhenium are inherently self-cleaning because of the volatility of rhenium oxides, and thus help to prevent pitting, polymer formation and high resistance at the contact surface. This property of rhenium is effectively maximized in the metal composites of the invention by reducing the diluting effect that true metallurgical alloying has on the metal. The same applies also of course to the metal of high electrical and thermal conductivity, in that these properties are more effectively retained in the metal composite than if the same metals were actually formed as an alloy.

In place of pure rhenium as the first component of the composite, lower cost considerations may dictate the use of a tungsten-rhenium alloy, as in Example IV. In general, a wide range of rhenium content may be employed; 20% to 80% by weight is preferred for some applications but good results may be obtained in other applications utilizing 5% to 95% by weight of rhenium.

Best results are found where the rhenium powder particle size is held between about 2 and 5 microns (Fisher sub-sieve), however a range of from 1 to about 12 microns appears operative. The particle size of the other component is preferably the same as the rhenium component for best mixing in the blended, pressed and sintered materials.

Densities of the mixed powder composites average at least about 75% of the theoretical, with higher densities on the order of 90% being readily obtained, particularly with cold rolling after the sintering step. Densities of impregnated composites are usually 95% of the theoretical, or higher.

With the availability of the metal composites herein disclosed, various improvements are now made possible in electrical contacting apparatus of various types. Among such apparatus may be mentioned such known equipment as relays, voltage regulators, circuit breakers and ignition points. While the general design and construction of such apparatus is basically unaffected by the incorporation of the novel metal composites in the contact elements, smaller size, larger current-carrying capacity and more complete encapsulation of the apparatus are made possible resulting in substantially improved units of greater mechanical and electrical efficiency.

What is claimed is:

1. A metal composite consisting essentially of:

(1) a sintered compact of refractory metal powder selected from the group consisting of rhenium and rhenium-tungsten mixtures, said refractory metal compact constituting a skeletal structure for said composite, and (2) a fused matrix metal enveloping and interspersed in said refractory metal skeletal structure, said matrix metal being selected from the group consisting of gold, silver and copper powders, said refractory and matrix metals being substantially unalloyed in the finished composite.

2. A metal composite as defined in claim 1, wherein said metal compact has a density equal to at least 75% of the theoretical maximum density.

3. A metal composite as defined in claim 1, wherein the matrix metal is from 5% to 96% by weight of the composite.

4. A metal composite as defined in claim 3, wherein the matrix metal is selected from the group consisting of gold, silver and copper.

5. A metal composite as defined in claim 1, wherein the matrix metal is from 20% to 80% by weight of the composite.

6. A metal composite as defined in claim 1, wherein said refractory metal powder consists of a tungsten-rhenium (95%–5% by weight) mixture and said matrix metal is silver.

7. A metal composite as defined in claim 1, wherein said refractory metal powder consists of a tungsten-rhenium (95%–5% by weight) mixture and said matrix metal is silver.

References Cited

UNITED STATES PATENTS

| | | | |
|---|---|---|---|
| 3,125,441 | 3/1964 | Lafferty | 29—182.1 X |
| 3,236,699 | 2/1966 | Pugh | 75—207 X |
| 3,364,018 | 1/1968 | Kirkpatrick | 75—20 X |
| 3,411,902 | 11/1968 | Krock et al. | 75—208 X |

CARL D. QUARFORTH, Primary Examiner

B. H. HUNT, Assistant Examiner

U.S. Cl. X.R.

29—182; 75—207, 208 R